No. 816,122.  
PATENTED MAR. 27, 1906.  
G. W. PULLIAM.  
BICYCLE ATTACHMENT.  
APPLICATION FILED JULY 26, 1905.  
2 SHEETS—SHEET 1.
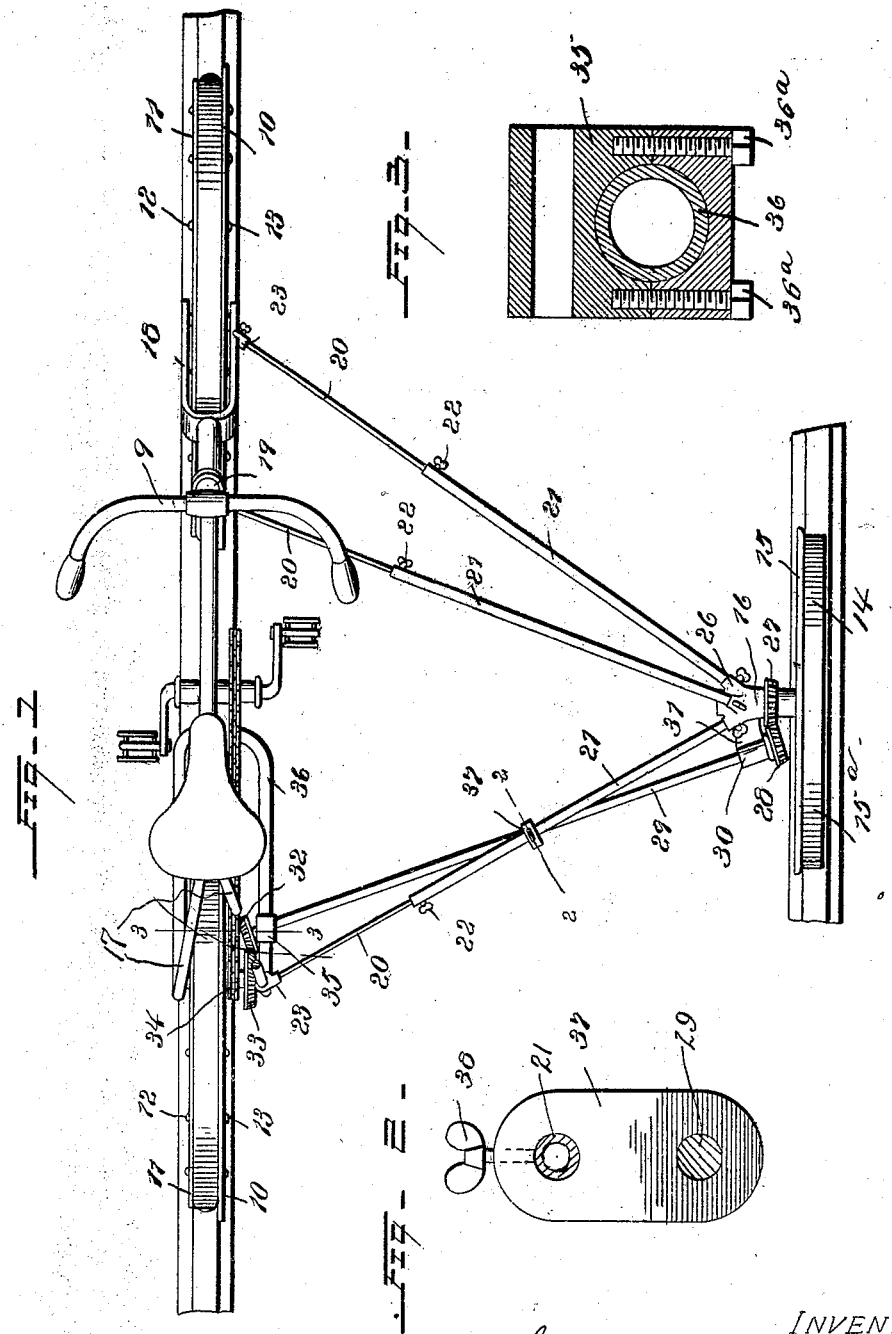
WITNESSES  
INVENTOR  
George W. Pulliam  
By Milo B. Stevens and Co.  
Attorneys.

No. 816,122. PATENTED MAR. 27, 1906.
G. W. PULLIAM.
BICYCLE ATTACHMENT.
APPLICATION FILED JULY 26, 1905.
2 SHEETS—SHEET 2.
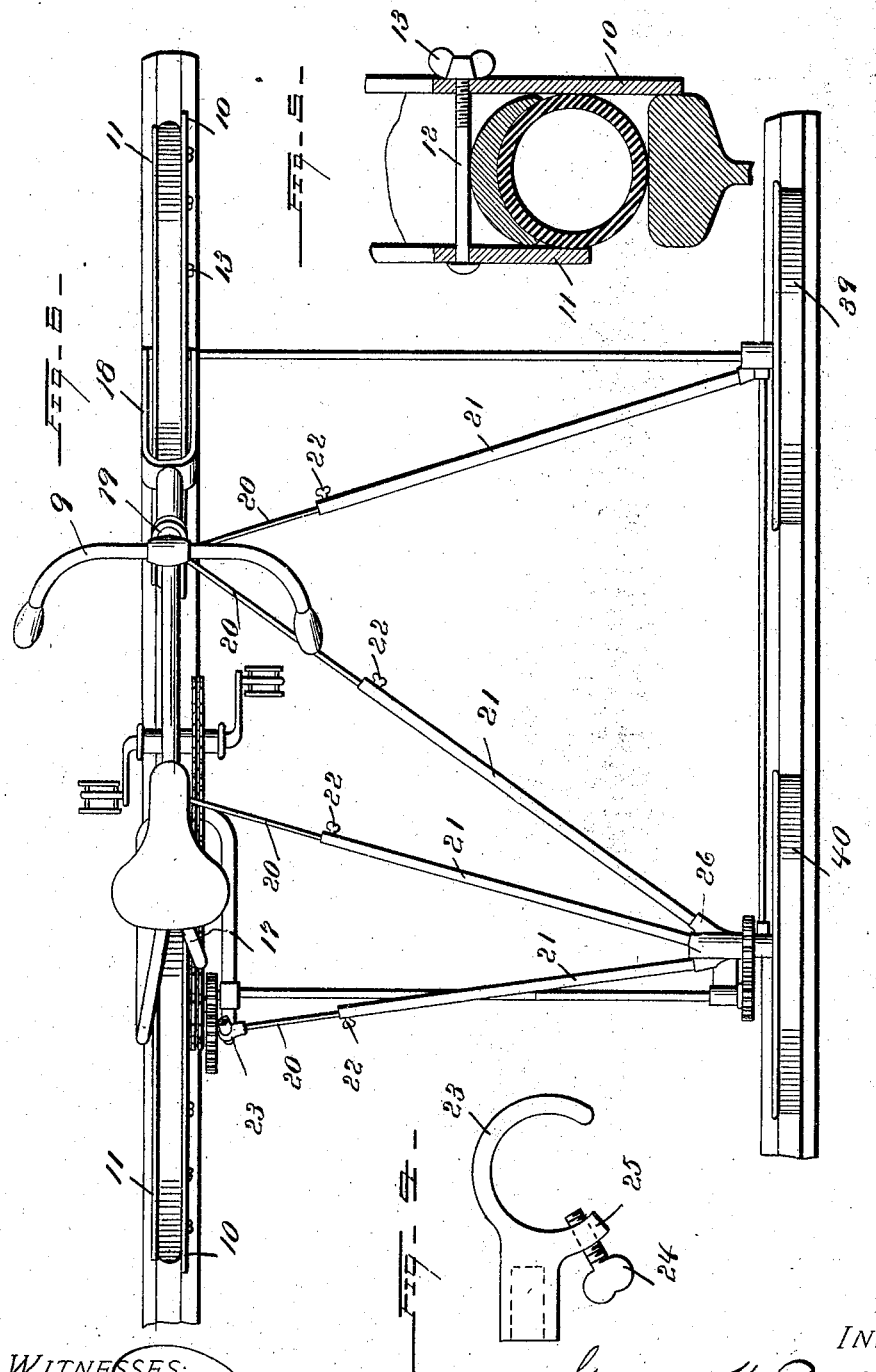
WITNESSES:
INVENTOR
George H. Pulliam
By
Milo B. Stevens and Co.
Attorneys.

UNITED STATES PATENT OFFICE.

GEORGE W. PULLIAM, OF COLUMBIA, MISSOURI.

BICYCLE ATTACHMENT.

No. 816,122.  Specification of Letters Patent.  Patented March 27, 1906.

Application filed July 26, 1905. Serial No. 271,355.

*To all whom it may concern:*

Be it known that I, GEORGE W. PULLIAM, a citizen of the United States, residing at Columbia, in the county of Boone and State of Missouri, have invented new and useful Improvements in Bicycle Attachments, of which the following is a specification.

My invention is an attachment for bicycles to adapt the same for travel on railway-tracks.

The object of the invention is to remedy certain defects in attachments of this kind now in use; and to this end it consists in certain novel features of construction hereinafter described and claimed.

In the accompanying drawings, Figure 1 is a plan view showing the attachment in use. Figs. 2 and 3 are transverse sectional views on the lines 2 2 and 3 3, respectively, of Fig. 1. Fig. 4 is a detail showing the end of one of the transverse braces hereinafter described. Fig. 5 is a sectional view showing the manner in which the flanges with which the bicycle-wheels are fitted are secured. Fig. 6 is a plan view of a modification.

Referring specifically to the drawings, 9 denotes an ordinary bicycle. Its wheels are fitted on each side with flanges 10 and 11, respectively, the former of which projects beyond the tire to extend along the inner side of the rail, as clearly shown in Fig. 5. The outside flange 11 does not project beyond the tire. These flanges give the bicycle a firm and steady bearing on the rail without affecting the resiliency of the tires. The flanges are made of sheet metal and are fastened to the wheels by bolts 12, provided with wing-nuts 13. These bolts extend through the flanges just behind the felly of the wheels, and upon tightening the nuts 13 the flanges are securely fastened.

The auxiliary wheel is indicated at 14 and is flanged, as at 15, similar to an ordinary car-wheel. A rubber tire $15^a$ is also provided to give the wheel a better hold on the rail and prevent slipping. The axle of the wheel 14 has its bearings in a block 16, which is connected by transverse braces with the frame of the bicycle. Three braces are shown, they being connected to the rear fork 17, front fork 18, and the handle-bar post 19, respectively. The braces comprise two telescoping sections 20 and 21, respectively, which are held in adjusted position by set-screws 22. The ends of the sections 20 which are fastened to the bicycle-frame have hooks 23 extending around the parts of the frame heretofore mentioned. The hooks are clamped to the frame by set-screws 24, which are threaded through lateral extensions 25 at the ends of the sections 20 opposite the hooks. The sections 21 are fastened by set-screws in short socket-pieces 26, formed integral with and projecting from the block 16.

A bevel-gear 27 is fast on the axle of the wheel 14 and meshes with a bevel-gear 28 on a shaft 29, journaled in a bearing-block 30, which is formed integral with the block 16, said parts being connected by a web 31. The shaft 29 carries at its opposite end a bevel-gear 32, which meshes with a bevel-gear 33, bolted to or formed integral with the rear sprocket 34 of the bicycle. A block 35 is bolted on the rear fork 36 of the bicycle and has a bearing for the shaft 29. The block is in two pieces, as shown, which are clamped to the fork 36 by bolts $36^a$. The transverse brace connected to the fork 17 carries a block 37, having a bearing-hole through which the shaft 29 extends. The block is fastened to the brace by a set-screw 38 and within the block the shaft may be split and coupled in any suitable manner.

The parts herein described can be readily applied to any ordinary bicycle without altering its construction. The gearing between the drive-wheel of the bicycle and the auxiliary wheel is advantageous, as it keeps the latter in proper position on the rail, thus reducing the friction of its flange with rail, and thereby saving power and giving a greater rate of speed with the same power, as well as lessening the liability of derailment. Without the gearing the flange of the auxiliary wheel has a tendency when riding fast to bind against the edge of the rail and to drag behind, which brings the front wheel of the bicycle over inside the rail, which frequently causes upsetting of the rider. These objectional features are entirely eliminated by the gearing and rapid as well as safe riding is attained by its use.

In Fig. 6 is shown a plan view of a modification wherein two auxiliary wheels 39 and 40, respectively, are used. The rear wheel 40 is geared to the drive-wheel of the bicycle, as before. However, the bevel-gearing is dispensed with and a spur-gearing is used, the position of the wheel 40 with respect to the bicycle driving-wheel permitting the use of this form of gearing. The second auxiliary wheel is employed to give the attachment sufficient stability. In the first form the auxiliary wheel is abreast of the rider, which gives the attachment the necessary stability, but necessitates the use of bevel-gearing.

Having thus described my invention, what is claimed as new, and desired to be secured by Letters Patent, is—

1. The combination with a bicycle, of an auxiliary wheel extending from one side thereof, and geared to the drive-wheel of the bicycle.

2. The combination with a bicycle, of brace-rods extending laterally from the frame thereof, a bearing carried at the outer ends of said rods, and an auxiliary wheel mounted in said bearing, and geared to the bicycle.

3. The combination with a bicycle, of an auxiliary wheel, a bearing therefor having projecting socketed stems, brace-rods extending laterally from the bicycle-frame and secured in the sockets, and a gearing between the auxiliary wheel and the bicycle.

In testimony whereof I have signed my name to this specification in the presence of two subscribing witnesses.

GEO. W. PULLIAM.

Witnesses:
W. D. SITTON,
G. R. TAYLOR.